(12) United States Patent
Kamotani

(10) Patent No.: US 9,148,640 B2
(45) Date of Patent: Sep. 29, 2015

(54) IMAGE EDITING APPARATUS AND THUMBNAIL GENERATING METHOD

(71) Applicant: PANASONIC CORPORATION, Osaka (JP)

(72) Inventor: Yusuke Kamotani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

(21) Appl. No.: 13/752,900

(22) Filed: Jan. 29, 2013

(65) Prior Publication Data
US 2013/0195426 A1 Aug. 1, 2013

(30) Foreign Application Priority Data
Jan. 30, 2012 (JP) .................................. 2012-016641

(51) Int. Cl.
| | | |
|---|---|---|
| G11B 27/00 | (2006.01) | |
| H04N 9/79 | (2006.01) | |
| G11B 27/034 | (2006.01) | |
| G11B 27/34 | (2006.01) | |

(52) U.S. Cl.
CPC .............. *H04N 9/79* (2013.01); *G11B 27/034* (2013.01); *G11B 27/34* (2013.01)

(58) Field of Classification Search
CPC ................ H04N 9/79; H04N 1/00167; H04N 21/47205; G11B 27/34; G11B 27/034; G11B 27/031; G11B 27/28; G11B 20/10; G06T 11/60
See application file for complete search history.

(56) References Cited

U.S. PATENT DOCUMENTS

| | | | |
|---|---|---|---|
| 2006/0004698 A1* | 1/2006 | Pyhalammi et al. | 707/2 |
| 2007/0248313 A1* | 10/2007 | Kageyama | 386/55 |
| 2008/0123966 A1* | 5/2008 | Nishida et al. | 382/203 |
| 2010/0053695 A1* | 3/2010 | Togami | 358/448 |
| 2012/0027384 A1* | 2/2012 | Takeda | 386/278 |
| 2013/0076773 A1* | 3/2013 | Chen et al. | 345/589 |
| 2013/0086051 A1* | 4/2013 | Brahms et al. | 707/723 |
| 2014/0040737 A1* | 2/2014 | Guerrera et al. | 715/716 |

FOREIGN PATENT DOCUMENTS

| | | |
|---|---|---|
| JP | 10-276388 A | 10/1998 |
| JP | 2002-135707 A | 5/2002 |
| JP | 2007-110566 A | 4/2007 |
| JP | 2011-029938 A | 2/2011 |

\* cited by examiner

*Primary Examiner* — Thai Tran
*Assistant Examiner* — Stephen Smith
(74) *Attorney, Agent, or Firm* — McDermott Will & Emery LLP

(57) ABSTRACT

An image editing apparatus includes: a processor that: (i) generates an editing information indicating a content of editing applied to at least one of frames included in a video stream, and performs an editing process in which the editing is applied to the at least one frame; (ii) specifies a subject frame to be edited from among the frames, based on the editing information; and (iii) generates a thumbnail for the subject frame to which the editing has been applied, and outputs the generated thumbnail.

5 Claims, 8 Drawing Sheets

FIG. 5

<Example of editing instruction (whole length of moving picture = 0:00-3:00)>

| Type | Time period (second) | Size (pixel) | |
|---|---|---|---|
| E1.Text (fade-in) | 0:00-0:10 | 1000x400 | ..... |
| E2.Stamp (flower) | 0:30-0:45 | 100x100 | ..... |
| E3.Stamp (star) | 1:00-1:15 | 100x100 | ..... |
| E4.Stamp (light) | 1:00-1:15 | 100x100 | ..... |
| E5.Stamp (star) | 1:00-1:15 | 100x100 | ..... |
| E6.Text (fade-in) | 2:00-2:05 | 800x400 | ..... |
| E7.Stamp (arrow) | 2:30-2:45 | 90x90 | ..... |

FIG. 8

<Example of result of priority calculation (the maximum number of thumbnail = 3)>

| Editing instruction | Priority (1st thumbnail) | Priority (2nd thumbnail) | Priority (3rd thumbnail) |
|---|---|---|---|
| A1 = E1 | 127.9 | – | – |
| A2 = E2 | 88.4 | 51.5 | 51.5 |
| A3 = E3·E4·E5 | 98.6 | 65.7 | 98.6 |
| A4 = E6 | 96 | 96 | – |
| A5 = E7 | 92.4 | 92.4 | 53.9 |

IMAGE EDITING APPARATUS AND THUMBNAIL GENERATING METHOD

CROSS REFERENCE TO RELATED APPLICATION

The present application is based on and claims priority of Japanese Patent Application No. 2012-016641 filed on Jan. 30, 2012. The entire disclosure of the above-identified application, including the specification, drawings and claims is incorporated herein by reference in its entirety.

FIELD

The present disclosure relates to image editing apparatuses, and particularly to an image editing apparatus capable of editing a video.

BACKGROUND

Patent Literature (PTL) 1 discloses a video editing device for obtaining and displaying a plurality of thumbnails from a predetermined zone in a video when a user edits the video, thereby allowing the user to check the thumbnails before the editing.

In addition, a mechanism has also been known that a series of information in relation to editing operation is allowed to be stored as editing project information, and the editing operation can be halted and restarted, in order to cope with a fact that the editing of the video takes much operation-time including, for example, trial and error by a user.

CITATION LIST

Patent Literature

[PTL 1] Japanese unexamined patent application publication No. 2007-110566

SUMMARY

Technical Problem

The present disclosure provides an image editing apparatus capable of efficiently performing editing operation on a video.

Solution to Problem

An image editing apparatus according to the present disclosure includes: a processor that: (i) generates an editing information indicating a content of editing applied to at least one of frames included in a video stream, and performs an editing process in which the editing is applied to the at least one frame; (ii) specifies a subject frame to be edited from among the frames, based on the editing information; and (iii) generates a thumbnail for the subject frame to which the editing has been applied, and outputs the generated thumbnail.

Advantageous Effects

An image editing apparatus according to the present disclosure can efficiently perform editing operation on a video.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 is a diagram which shows an example of an editing instruction included in an editing project file according to the embodiment.

FIG. 8 is a diagram which shows an example of a result of priority-degree calculation on editing instructions according to the embodiment.

DESCRIPTION OF EMBODIMENTS

Figure 1:
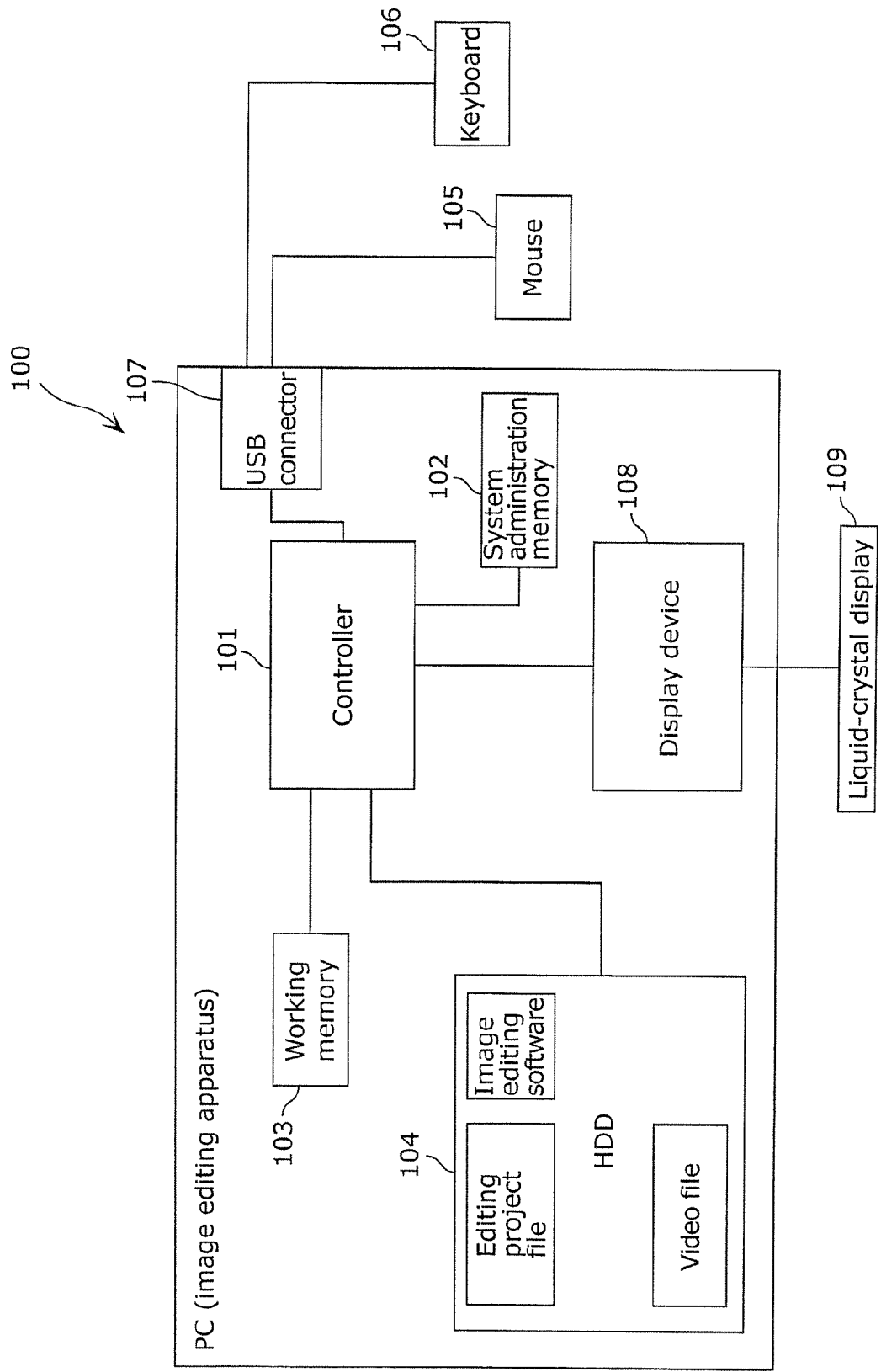
FIG. 1 is a diagram which shows a primary hardware configuration of a personal computer (PC) according to an embodiment.

The inventor of the present disclosure has found a below shown problem with respect to the aforementioned conventional technique.

There have been known an electronic device and a program which are used for easily editing a material that is still picture data or video data. Especially in a case of editing the video data, a method for presenting a thumbnail to a user by displaying the thumbnail may be adopted for easy check on a content of the video to which current editing is not yet applied.

In addition, as described above, a technique has been known in which a series of information in relation to editing operation is stored as editing project information. When a user restarts the editing operation using the stored editing project information, for example, the user, however, may forget what kind of intention the user had on the editing project last time.

In such a case, it is not easy for the user to recall the editing intention he/she had last time. This might have prevented smooth restart on the editing operation.

In the present disclosure, an image editing apparatus for solving the above problem is described in relation to a configuration, operation, and the like, of the image editing apparatus.

Hereinafter, an embodiment is described in detail, arbitrarily referring to the drawings. Detailed description beyond necessity may be omitted. For example, detailed description for well-known matter or duplicated description for a configuration substantially same with those previously described may be omitted. This is to avoid the following description from being unnecessarily redundant, and helps a person skilled in the art to easily comprehend the description.

It should be noted that the inventor provides the attached drawings and the following description for adequate comprehension by a person skilled in the art. It is not intended that the drawings and the description limit a subject matter of the claims.

Embodiment

Hereinafter an embodiment is described, referring to FIGS. 1 to 8.

FIG. 1 is a diagram which shows a primary hardware configuration of a PC 100 according to the embodiment.

Figure 2:
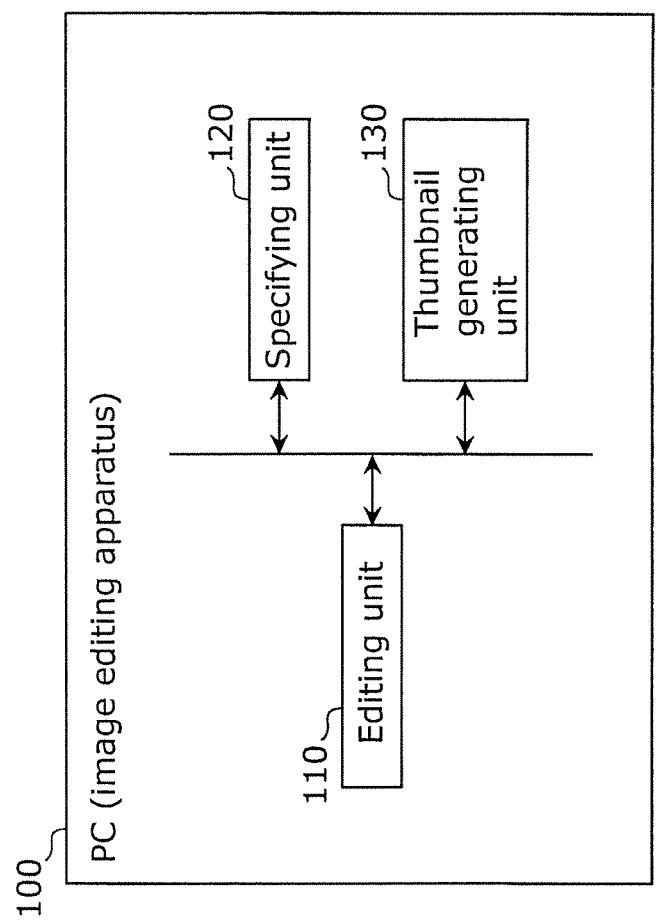
FIG. 2 is a diagram which shows the primary hardware configuration of the PC according to the embodiment.

FIG. 2 is a diagram which shows a primary functional configuration of the PC 100 according to the embodiment.

The PC 100 according to the embodiment includes: a processor that: (i) generates an editing information indicating a content of editing applied to at least one of frames included in a video stream, and performs an editing process in which the editing is applied to the at least one frame; (ii) specifies a subject frame to be edited from among the frames, based on the editing information; and (iii) generates a thumbnail for the subject frame to which the editing has been applied, and outputs the generated thumbnail.

With the PC 100 according to the present embodiment, a user can easily check an editorial intention at the time when the editing was halted on a video stream which was on a course of the editing. Accordingly, with the PC 100, editing operation for the video can efficiently be performed.

In the embodiment, as an example of the editing, a case of editing a movie (a video stream file (hereinafter, also referred to as "a video file")) is described.

A user edits the movie by inputting, into the PC 100, editing operation for the video file to be edited, as a series of editing instructions. The PC 100 is capable of outputting, as a preview image, a result obtained by applying the editing instruction by the user, to a liquid-crystal display 109 connected to the PC 100. As a result, the preview image is presented to the user in a screen displayed by the liquid-crystal display 109.

The PC 100 is also capable of outputting the video file in which a series of the editing operation is completed, as a single video file which reflects the series of the editing operation, in accordance with a predetermined video file format.

During the editing of the video file, the PC 100 is also capable of storing, as an editing project file, a series of the editing instructions by a user in a hard disc drive (HDD) in a process that the user inputs the series of the editing instructions into the PC 100.

This allows the user to halt the editing operation. Meanwhile, the user can restart the editing operation on the video file by controlling a controller 101 of the PC 100 to load the stored editing project file.

Hereinafter, the configuration and the operation of the PC 100 according to the embodiment are described in detail, referring to the drawings.

[1. Configuration of System]

First, a configuration of the PC 100 is described, with reference to FIG. 1.

The PC 100 is an example of an image editing apparatus, and includes the controller 101, a system administration memory 102, a working memory 103, an HDD 104, a universal serial bus (USB) connector 107, and a display device 108. The PC 100 is also connected to a mouse 105, a keyboard 106, the liquid-crystal display 109, and so on.

The controller 101 includes a processor, such as a central processing unit (CPU), and serves as a processing unit which performs various information processing in the PC 100. The controller 101 is electrically connected to the system administration memory 102, the working memory 103, the HDD 104, the display device 108, and the USB connector 107.

The controller 101 is capable of changing the screens displayed on the liquid-crystal display 109, via the display device 108. The controller 101 receives, via the USB connector 107, an instruction from a user by means of the mouse 105 and the keyboard 106.

The controller 101 totally controls a system (not shown) in relation to power which is supplied to each of units in the PC 100.

The system administration memory 102 is a memory in which an operating system (OS) and so on is stored. In addition, a system time, and so on is stored in the system administration memory 102. The system time is updated in such a manner that the controller 101 executes the program in the OS.

The working memory 103 is a memory for temporarily storing information necessary for the controller 101 to perform various processing. In a case of editing a video file, the controller 101 performs the editing in accordance with the editing instruction assigned by a user. A series of the editing instructions and the like which are assigned by the user are stored in the working memory 103 by the controller 101. The editing instruction is described later in detail, referring to drawings including FIG. 5.

The HDD 104 is a disc drive for storing an unedited video file, a video file before completion of the editing, a video file after the completion of the editing, and so on. In the HDD 104, an execution file for an image editing software is also stored.

The mouse 105 is a pointing device to be used by a user upon the editing operation. The user can assign the editing instruction (inputting of the editing instruction to the PC 100) on the screen which displays the image editing software, by operating the mouse 105.

The keyboard 106 is a keyboard device used, for example, for inputting a character to the PC 100 during the editing operation by a user.

The USB connector 107 is a connector for connecting the mouse 105 and the keyboard 106 to the PC 100.

The display device 108 is a device for imaging screen information calculated by the controller 101, and transmitting the screen information to the liquid-crystal display 109.

The liquid-crystal display 109 is a display device for displaying the screen information which has been subjected to the imaging in the display device 108.

The controller 101 reads out the image editing software from the HDD 104, stores the read-out image editing software in the working memory 103, and activates the image editing software to be executed. The controller 101 performs the following processes, for example, in accordance with the program of the image editing software.

1. The controller 101 receives, via the USB connector 107, the editing operation (specification of the editing instruction) performed by a user by means of the mouse 105 or the keyboard 106.

2. The controller 101 controls the working memory 103 to store a series of the editing instructions assigned by the user, in the working memory 103. The controller 101 further supplies image information to the display device 108 for displaying, on the liquid-crystal display 109, the result (preview image) obtained by the editing performed in accordance with the editing instruction.

3. The controller 101 receives, via the USB connector 107, operation for storing the editing project file, performed by the user using the mouse 105 or the keyboard 106.

4. The controller 101 controls the HDD 104 to store the series of the editing instructions stored in the working memory 103, as the editing project file.

5. The controller 101 receives operation for halting the editing operation by the user, and once terminates editing on the video file. The controller 101 receives operation for restarting the editing operation by the user, and restarts the system.

6. The controller 101 receives, via the USB connector 107, operation for performing selection on the editing project file by the user using the mouse 105 or the keyboard 106.

7. The controller 101 analyzes a content of the editing-project file selected by the user, and generates summary information (thumbnail image, and the like) which indicates editing intention of the user.

8. The controller 101 provides image information including the summary information to the display device 108 for displaying the summary information (thumbnail image and the like) on the liquid-crystal display 109.

9. The controller 101 repeats the above processes 1 to 8 until the editing operation by the user terminates.

10. The controller 101 receives, via the USB connector 107, operation for outputting and storing the video file by the user by means of the mouse 105 or the keyboard 106.

11. The controller 101 generates, in accordance with the predetermined video file format, the video file which is the result of the editing operation performed in accordance with the series of the editing instructions, and stores the obtained video file in the HDD 104.

Next, a functional configuration of the PC 100 according to the embodiment is described, referring to FIG. 2.

As shown in FIG. 2, the PC 100 according to the embodiment includes, as a primary functional configuration, an editing unit 110, a specifying unit 120, and a thumbnail generating unit 130.

The editing unit 110 generates editing information which indicates a content of the editing applied to at least one frame among a plurality of frames included in the video stream, and performs an editing process in which the editing is applied to the aforementioned at least one frame.

In the embodiment, the editing unit 110 has a function of generating, as the editing information, the editing project file indicating the content of the editing on the video stream read out from the HDD 104, and a function of performing the editing on the video stream. The generated editing-project file is stored in the HDD 104.

In the embodiment, "editing the video file" means that the editing processing is performed on the video (video stream) included in the video file, by the PC 100 functioning as an image editing apparatus.

In addition, "editing" or "editing process" performed on the video stream means, for example, processing of adding a character, an image, or a symbol to a single frame or continuing plural frames, adding an effect in transition upon switching scenes, adjusting brightness, chroma, or a color phase, improving an image quality, and so on.

In other words, "editing" or "editing process" can be also referred to as processing, modification, or change on the image to be edited (at least a part of an image in the frame to be edited).

The specifying unit 120 specifies a subject frame to be edited by the editing unit 110 from the frames, based on the editing information generated by the editing unit 110.

In the embodiment, the specifying unit 120 specifies the subject frame from among the frames included in the video stream, based on the editing project file read out from the HDD 104.

The thumbnail generating unit 130 generates a thumbnail for the subject frame to which the editing has been applied, and outputs the generated thumbnail.

For example, the thumbnail for the subject frame can be obtained by decreasing in size a part of or whole the subject frame to which the editing is applied, to a predetermined size.

In the embodiment, the respective processes in the editing unit 110, the specifying unit 120, and the thumbnail generating unit 130 can be achieved in such a manner that the controller 101 executes the image editing software, and the like.

[2. Configuration of Editing Screen]

Subsequently, a configuration of an editing screen outputted from the PC 100 and displayed on the liquid-crystal display 109 is described, referring to FIG. 3.

Figure 3:
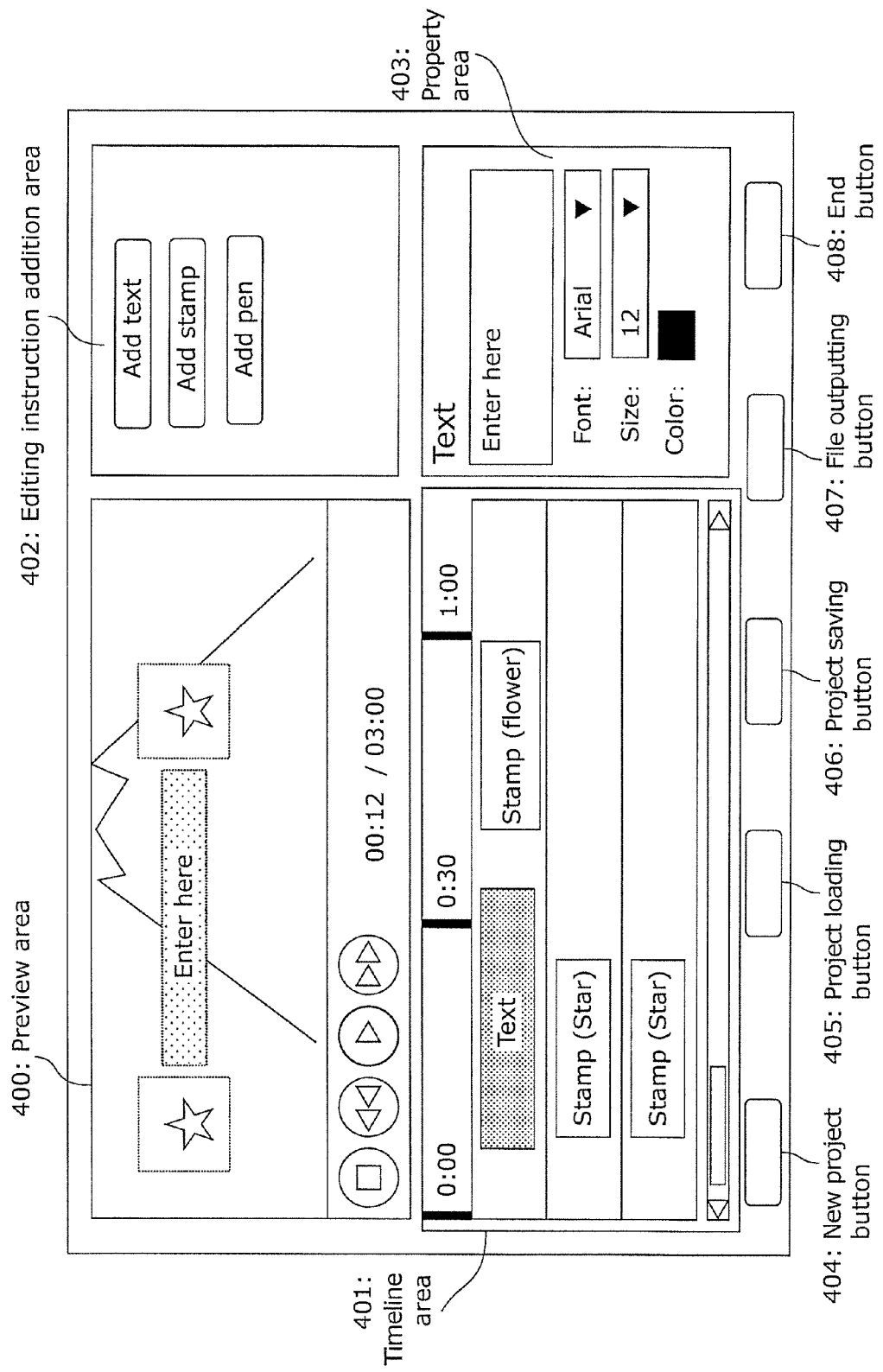
FIG. 3 is a schematic diagram which shows an editing screen outputted by the PC according to the embodiment.

FIG. 3 is a schematic diagram which shows the editing screen outputted from the PC 100 according to the embodiment. In other words, FIG. 3 shows an example of a display screen outputted from the PC 100 and displayed on the liquid-crystal display 109.

As shown in FIG. 3, the editing screen displayed on the liquid-crystal display 109 includes a preview area 400, a timeline area 401, an editing instruction addition area 402, a property area 403, a new project button 404, a project loading button 405, a project saving button 406, a file outputting button 407, an end button 408, and so on.

The preview area 400 is a screen used for reproducing a video which is being currently edited. For example, when a user arranges text as the editing instruction, a text box is displayed in the preview area 400, at a position where the text is to be displayed, as shown in FIG. 3. The user can adjust the position where the text is to be displayed by operating the position of the text box using the mouse 105 and the like.

The timeline area 401 is an area used for displaying, on a timeline, each of the editing instructions set by the user, and for performing the editing in accordance with an instruction by the user. The left end of the timeline 401 expresses a beginning time of a range displayed in the timeline area 401, in a whole video stream displayed, while the right end of the timeline 401 expresses an end point of the time in the range.

The user can adjust the range displayed in the timeline area 401, by operating a horizontal scroll bar displayed in a lower part of the timeline area 401.

Each of boxes displayed on the timeline expresses a corresponding one of the editing instructions. A position of the left end of the box expresses the time at which the editing instruction becomes valid on the video, while a position of the right end of the box expresses the time at which the editing instruction becomes invalid.

To be specific, when a certain box is focused on in the timeline area 401, the position of the left end of the box shows the time from which the editing corresponding to the box is applied, while the position of the right end shows the time at which the application of the editing corresponding to the box terminates. A length of the box shows a length of a time period while the editing is applied.

The user can arrange a plurality of editing instructions at the same time. For the occasion, the boxes are displayed with being mutually displaced vertically on the timeline.

In the example shown in FIG. 3, a case is shown in which: (i) "text (character-string display)" and two "stamp (star)" are displayed approximately at the same time, (ii) subsequently, only the "text (character-string display)" is remained and the two "stamp (star)" are made invalid. In addition, FIG. 3 also shows the case in which (iii) the remaining "text (character-string display)" is made invalid, and (iv) "stamp (flower)" is displayed after a certain period of time elapses.

The editing instruction addition area 402 is an area for a user to add each of the editing instructions. In the editing instruction addition area 402, editing instruction buttons each of which is associated with a corresponding one of the editing instructions (a text, a stamp, a speed-change, and so on) is displayed. The user can place a editing content ("text", "stamp", and so on) indicated by the editing instruction, on the video stream, by pressing the desired editing instruction button.

A spatial position of the placed editing instruction in relation to a screen coordinates on the screen on which the video is displayed is reflected in the preview area 400. Accordingly, the user can easily check the spatial position where the editing instruction is placed.

The temporal position at which the editing instruction is placed is displayed on the timeline area 401 in the video stream currently being edited. This allows the user to easily check the time position where the editing instruction is placed.

In addition, the user can adjust the spatial position and the temporal position by moving the box associated with a corresponding one of the editing instructions, in the respective preview area 400 and timeline area 401.

The user can also adjust a spatial range (a spatial size at which the editing is applied) and a temporal range (a length of the time period during which the editing is applied) by changing a size of the box associated with the corresponding one of the editing instructions, in the respective preview area 400 and timeline area 401.

The property area 403 is an area used for adjusting the content of each of the editing instructions which are already placed. For example, information including a size and a color of a font of the text specified by the editing instruction, but the temporal and spatial position and range, can be adjusted by inputting information in the property area 403.

In addition, the information corresponding to the editing instruction being currently selected in the property area 403 is displayed on the preview area 400 or the timeline area 401.

For example, FIG. 3 shows a state in which an input of characters, symbols and so on corresponding to the editing instruction of the "text" displayed on the timeline area 401, and a specification on the size and the color of the font are acceptable in the property area 403.

The new project button 404 is a button to be pressed when another video editing is newly started. Upon pressing the new project button 404, a screen of a list of the video files is displayed, so that a user can select the video file to be edited. Accordingly, the user can treat the selected video stream as a new subject to be edited.

The project loading button 405 is a button to be pressed when a user loads the editing project file (hereinafter, referred to simply as a "project") previously stored, and restarts the operation.

In the editing screen (see FIG. 3), upon pressing the project loading button 405, a project reading screen (described later, referring to FIG. 4) is outputted from the PC 100 so as to be displayed on the liquid-crystal display 109. The user selects a project to be loaded, in the project loading screen.

As a result of the above processes, a state of the project at the time when the project was stored is reproduced in the preview area 400 and the timeline area 401. In other words, the content of a plurality of editing indicated in the project is reflected and displayed on the preview area 400 and the timeline area 401.

The project saving button 406 is a button to be pressed when a user halts the operation with storing a current editing state in the HDD 104 as the editing project file. When the project saving button 406 is pressed, the PC 100 causes the liquid-crystal display 109 to display a dialogue for setting a project name with which the current editing state is saved. The user inputs the project name for the storage using the dialogue. The inputted project name is given to the editing project file as a file name. In the editing project file, information of the video stream to be edited and information of the series of the editing instructions are stored. An example of a data configuration of the editing project file is described later, referring to FIG. 5.

The editing project file is an example of the editing information, and each of the editing instructions indicated in the editing project file is an example of an individual content of the editing.

The file outputting button 407 is a button to be pressed when the video file in which the current editing state is reflected by a user is stored in the HDD 104. It should be noted that a format of outputting the video file created for the occasion may be previously set so as to be selectable by the user. In this case, if the user selects an advanced video codec high definition (AVCHD) file format, for example, the PC 100 creates a video file in the AVCHD file format.

The ending button 408 is a button to be pressed when the user terminates an editing system of the video file, i.e., the image editing software.

[3. Configuration of Project Loading Screen]

Subsequently, a configuration of a project loading screen displayed on the liquid-crystal display 109 is described, referring to FIG. 4.

Figure 4:
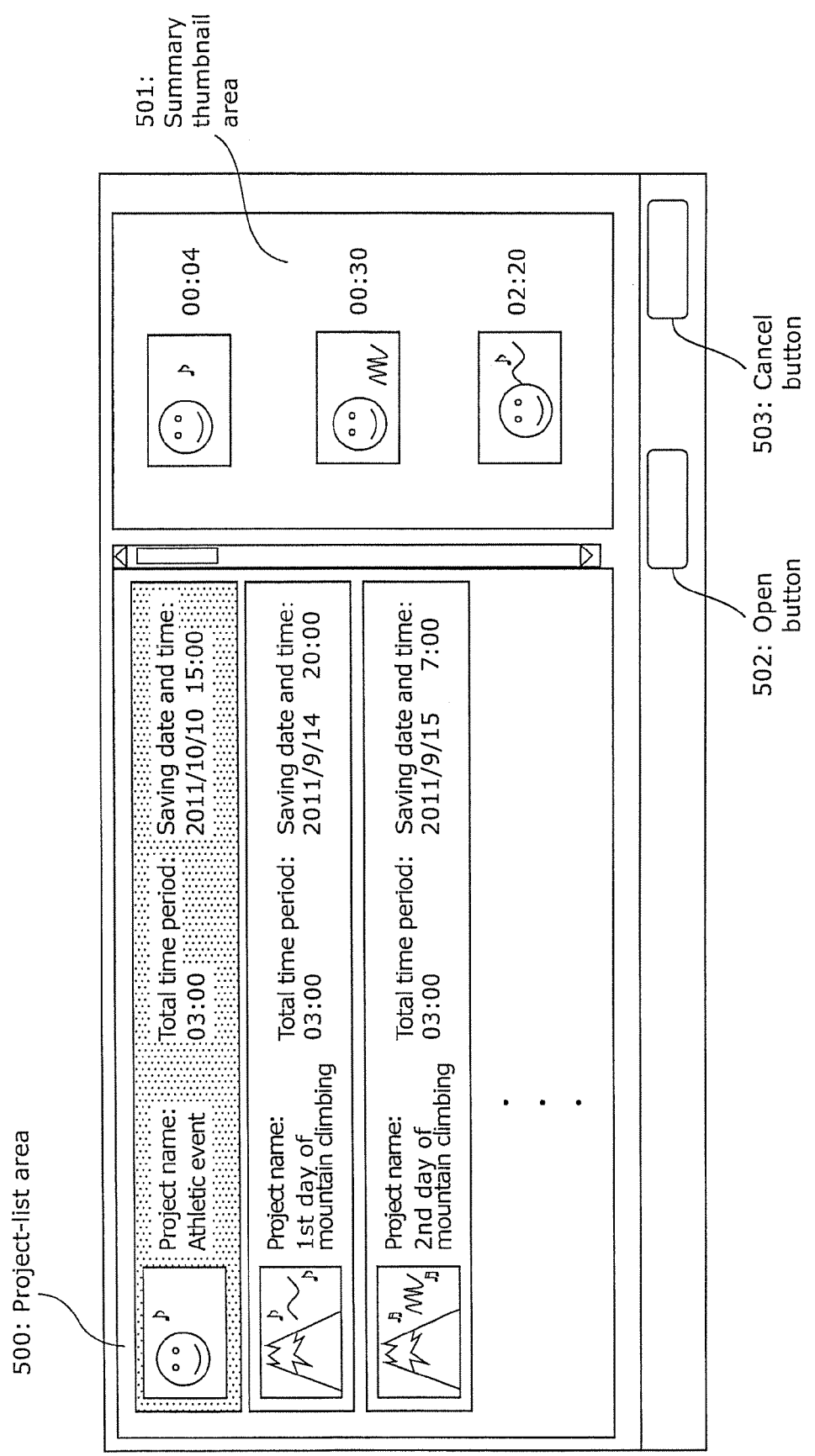
FIG. 4 is a schematic diagram which shows a project loading screen outputted by the PC according to the embodiment.

FIG. 4 is a schematic diagram which shows the project loading screen outputted from the PC 100 according to the embodiment. In other words, FIG. 4 shows an example of the project loading screen outputted from the PC 100 and displayed on the liquid-crystal display 109.

As shown in FIG. 4, the project loading screen which is outputted from the PC 100 and is displayed on the liquid-crystal display 109 includes a project-list area 500, a summary thumbnail area 501, an opening button 502, a cancel button 503, and so on.

The project list area 500 is an area for listing and displaying the projects stored in the HDD 104 by a user. In the project list area 500, the project name, a total time period, a date and time of the storage, and so on are displayed as basic information for each of the projects. The user can allow one of the listed projects to be in a selected state.

For example, FIG. 4 shows that a project named "athletic event" is in the selected state.

The summary thumbnail area 501 is an area for displaying summary thumbnails for the projects allowed to be in the selected state by the user in the project list area 500.

The user views these summary thumbnails, and can easily check the content of the editing performed on the project. An algorithm with which the PC 100 generates the summary thumbnails is described later.

The opening button 502 is a button to be pressed when a user opens the project which has been allowed by the user to be in the selected state in the project list area 500. When the opening button 502 is pressed, the display on the liquid-crystal display 109 shifts to an editing screen showing a state in which the information of the project is loaded.

The cancel button 503 is a button to be pressed when a user cancels opening the project. When the cancel button 503 is pressed, the display on the liquid-crystal display 109 shifts to the editing screen showing a state before shifting to the project loading screen.

[4. Editing Instruction]

Subsequently, information contained in the editing instruction is described.

The editing instruction is information used for specifying, when the editing is applied to the video, what kind of editing is arranged on which of the temporal positions as well as which spatial positions.

In other words, the editing instruction is information indicating the content of the editing. The content of the editing includes a type of the editing, a temporal position at which the editing is applied, a length of a time period during which the editing is applied, a spatial position at which the editing is applied, a spatial size of an area in which the editing is applied, and so on.

A type of the editing instruction includes a text instruction, a stamp instruction, a free curve instruction, a color control instruction, and so on.

The "text instruction" means to add a text in view of the type of editing, and contains, as information, a character string, a font, a temporal position, a spatial position, and the like in relation to the text to be displayed.

The "stamp instruction" means to add a stamp in view of the type of editing, and contains, as information, a path of a stamp image to be displayed, a temporal position, a spatial position, and the like in relation to the stamp to be displayed.

The "free curve instruction" means to add a free curve in view of the type of the editing, and contains, as information, a group of coordinates expressing a curved shape, a color of the curve, a diameter of the curve, a temporal position, and the like in relation to the curve to be displayed.

The "color control instruction" means to control a color in view of the type of the editing, and contains, as information, a content of the color control (brightness, chroma, and color phase) and a temporal position in relation to the color to be controlled.

The controller 101 stores the series of the editing instructions in the working memory 103 while a user performs the editing, and reflects the contents of the editing instruction on the editing screen. When a user stores the project, the controller 101 stores, as the editing project file, information containing the series of the editing instructions in the HDD 104.

When a video file in which a user has completed the editing operation is outputted as the video file in the AVCHD format, the controller 101 registers the editing instruction stored in the working memory 103 in the editing project file. The controller 101 further generates a video file reflecting the series of the editing instructions indicated in the editing project file. The generated video file is stored in the HDD 104.

FIG. 5 is a diagram which shows editing instructions included in the editing project file according to the embodiment.

FIG. 5 shows the editing project file indicating the editing instructions from E1 to E7. To be specific, the editing unit 110 (controller 101) performs the editing process for each of the editing instructions, so as to generate the video file (video stream) reflecting the editing instructions.

Processing is described later, in which the controller 101 selects, from the editing instructions, an editing instruction to be subjected to a thumbnail.

[5. Operation for Generating Summary Thumbnails]

Subsequently, an operation of the PC 100 to generate summary thumbnails based on (i) a video to be edited, (ii) a series of the editing instructions, and (iii) the maximum number of the thumbnails is described.

In the PC 100 according to the embodiment, the summary thumbnails are generated based on the video to be edited, and a series of the editing instructions assigned by the user for the video to be edited.

In the PC 100 according to the embodiment, the maximum number of the thumbnails is defined, so that the summary thumbnails in the video being currently edited can be generated more compactly.

Figure 6:
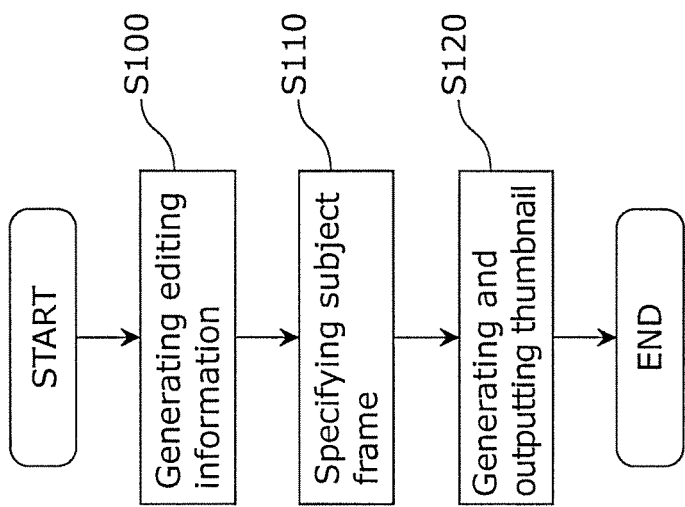
FIG. 6 is a flowchart which shows a flow of a basic process of generating the editing project file and a thumbnail in the PC according to the embodiment.

A flow of basic processing performed by the PC 100 to create the editing project file and the thumbnails is described, referring to FIG. 6.

FIG. 6 is a flowchart which shows a flow of basic processing for generating the editing project file and the thumbnails in the PC according to the embodiment.

The editing unit 110 generates the editing information which indicates the content applied to at least one frame among a plurality of frames included in the video stream (Step S100).

In the embodiment, the editing project file (see FIG. 5, for example) is generated as the editing information.

The specifying unit 120 specifies a subject frame to be edited by the editing unit 110 from the frames, based on the generated editing information (Step S110).

The thumbnail generating unit 130 generates a thumbnail for the subject frame to which the editing has been applied, and outputs the generated thumbnail (Step S120).

If the subject frame to which the editing therefor is applied is not stored in the HDD 104, the working memory 103, or the like at the time when the subject frame is specified by the specifying unit 120, the editing unit 110 applies the editing to the subject frame, and then, the thumbnail of the subject frame to which the editing has been applied is generated.

The PC 100 performs the aforementioned processing on the video stream to be edited, so as to generate and output at least one thumbnail which indicates editing intention for the video stream.

Figure 7:
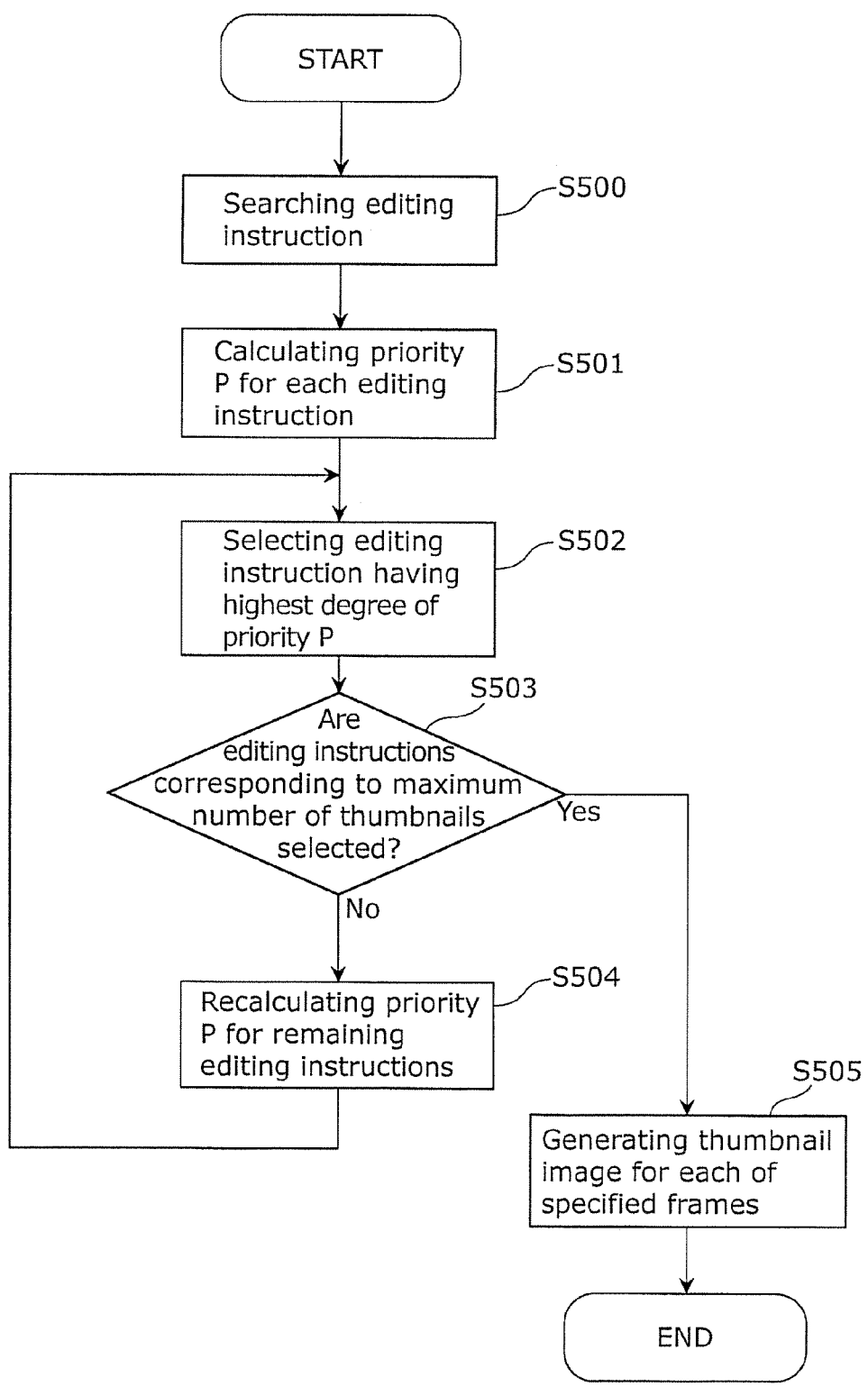
FIG. 7 is a flowchart which shows an example of a flow of a process of generating a group of summary thumbnails in the PC according to the embodiment.

Next, a specific example of a flow of processing for generating a group of the summary thumbnails including one or more thumbnails is described, referring to FIG. 7.

FIG. 7 is a flowchart which shows an example of a flow of processing in relation to generation of a group of summary thumbnails in the PC 100 according to the embodiment. Here, Steps S500 to S504 in FIG. 7 correspond to the Step S110 in FIG. 6. In addition, Step S506 in FIG. 7 corresponds to the Step S120 in FIG. 6.

Selection, in the project loading screen (see FIG. 4), of a single editing project file by a user among the editing project files, for example, serves as a trigger for a series of the processes shown in FIG. 7 to be performed.

The controller 101 searches a series of the editing instructions stored at the time when a user halted the editing last time, among the editing project file selected by the user, and collects the information contained in each of the editing instructions (Step S500).

At this time, the controller 101 examines whether or not the editing instructions which simultaneously start exist. For example, "text (character-strings display)" and two "stamp (star)" shown in FIG. 3 are an example of the simultaneously started editing instructions.

In the embodiment, the controller 101 performs processing in which a plurality of editing instructions start at the same time are considered as a single editing instruction. Under this condition, it is assumed that a total number of the editing instructions is r, and the ith editing instruction is Ai ($1 \leq i \leq r$).

Subsequently, the controller 101 calculates a priority P (i) for each of the editing instructions Ai (Step S501).

To be specific, a case is supposed that for a certain editing instruction Ai, a length of a time period during which the editing is applied to is $t(i)$, a size of a space (area) in the video screen, to which the editing is applied, is $s(i)$, and weighting according to a type of the editing is $k(i)$. For the occasion, the priority P(i) can be defined as follows.

$$P(i)=t(i)+s(i)+k(i) \qquad \text{Expression 1}$$

It is not necessary for the t(i) and s(i) to respectively be a value itself for a length of each of time period and a value itself for a size of the space. The t(i) and s(i) may be a variable number having a positive correlation between these values, such as a variable number which increases according to the magnitude of each of values, for example.

With respect to k(i), it is previously determined that the larger the value of k(i) is, the higher an important degree of the editing type indicated by the editing instruction becomes, for example. With respect to the editing instruction indicating addition of the stamp, for example, it can be determined that the larger the value of k(i) is, the louder the type of the stamp indicated in the editing instruction becomes.

If the editing instruction Ai considers the editing instructions to be a single editing instruction as a whole in Step S500, the controller 101 determines values of t(i), s(i), and k(i) for the respective editing instructions, based on a predetermined standard.

For example, the controller 101 may adopt, as t(i), a value of the editing instruction having the longest time period, among the editing instructions. The controller 101 may adopt, as s(i), a sum of values indicating the spatial size of the editing instruction, and may adopt, as k(i), the greatest weighting among the editing instructions.

Subsequently, the controller 101 selects an editing instruction having the highest priority P among the editing instructions, as a subject for the first thumbnail (Step S502).

Specifically, the selection of the editing instruction Ai having the highest priority P specifies at least one frame among one or more frames to which the editing indicated in the editing instruction Ai is applied, as a subject frame from which the thumbnail is generated.

If the maximum number of the thumbnails is q (q≥1), and a superscript of the editing instruction of the subject for the jth thumbnail is expressed by x(j), x(1) satisfies P(x(1))=max (P(i)), where 1≤j≤q.

In other words, as the editing instruction to be selected for the subject for the first thumbnail, an editing instruction is selected in which, for example, a time period for applying the editing indicated in the editing instruction (application time period) is longer than a time period for applying the editing indicated in the editing instruction of other subject for the thumbnail.

Furthermore, as the editing instruction of the subject for the first thumbnail, the editing instruction is selected which has a larger area (applied area) to which the editing indicated in the editing instruction is applied, than an area to which the editing instruction of other subjects for the thumbnail is applied.

Still furthermore, as the editing instruction for the subject for the first thumbnail, a type of the editing indicated in the editing instruction is selected which is more important than a type of the editing in the editing instruction for other subjects for the thumbnail.

Subsequently, the controller 101 checks whether or not the editing instructions corresponding to the maximum number of the thumbnails are selected (Step S503). Accordingly, it is checked whether or not the selection of the predetermined number of editing instructions is completed. As a result of the above, if the selection is completed (Yes in Step S503), the processing in the controller 101 shifts to Step S505.

If the editing instructions corresponding to the maximum number of the thumbnails are not selected (No in Step S503), the controller 101 again calculates the priority (Step S504) for selecting the editing instruction to be a subject for the second and subsequent thumbnail.

Here, consideration is given to determination of a suffix x(j) of the editing instruction for the subject for the jth thumbnail. If a list of the suffixes which are not selected for the subject for the thumbnail is expressed by y(i), 1≤i≤r−j+1 is satisfied.

In this case, the below-shown Expression 2 may be used for calculating the priority P for the selection of the editing instruction to be the subject for the second and subsequent thumbnail.

$$P(y(i)) = (t(y(i)) + s(y(i)) + k(y(i))) \times d(y(i)) \quad \text{Expression 2}$$

If a method for calculating the priority P for the second and subsequent subject thumbnail is same with the Expression 1, this step (Step S504) may be omitted and the process may shift to Step S502.

Here, d(y(i)) included in the Expression 2 is a spacing factor between the thumbnails (thumbnail spacing factor). To be specific, d(y(i)) shows how temporally distant the editing instruction to be calculated is from each of the j−1 editing instructions already selected as the thumbnail subject.

To be more specific, the thumbnail spacing factor is set so that a value thereof increases as the current editing instruction is temporally distant from the editing instructions already selected.

Accordingly, the editing instruction selected as the subject of the second and subsequent thumbnail is specified by an expression taking the spacing factor into account. Therefore, the editing instruction can be selected according to a standard that a thumbnail is evenly selected from the whole time length of the video, in addition to standards that the time-period required for the editing is longer, the area required for the editing is larger, and the type required for the editing is more important.

The thumbnail spacing factor need not be in proportion to a temporal difference between the non-selected editing instruction and the selected editing instruction, but may have a positive correlation with the temporal difference.

Subsequently, the controller 101 selects an editing instruction having the highest priority P, and allows the selected editing instruction to be subjected for the jth thumbnail (Step S502).

The aforementioned processing repeats until the number of the selected editing instructions reaches the maximum number q of the thumbnails (Yes in Step S503). If a total number r of the editing instructions is smaller than the maximum number q of the thumbnails, the repeat of the processing may be halted at the time when the number of the selected editing instructions reaches r, for example. Alternatively, the controller 101 may select q−r editing instructions from a time zone which is not selected as the thumbnail in the whole time period of the video, and may allow the selected editing instructions to be the subject for the thumbnail.

As described above, the controller 101 repeats processes of S503, S504, and S502, until the number of the editing instructions, which is corresponding to the maximum number of the thumbnails, are selected.

If the editing instructions corresponding to the maximum number of the thumbnails are selected in the Step S503, the controller 101 actually generates the thumbnail using each of the editing instructions selected as the subject for the thumbnail (Step S505).

The controller 101 specifies, as the subject frame, a frame on the beginning time of the editing instruction selected as the thumbnail subject, for example, and generates the thumbnail for the subject frame to which the editing indicated in the editing instruction is applied.

If a subject frame to which the editing is applied is not stored in the HDD 104 and the like at the time when the subject frame is specified, the controller 101 applies the editing to the subject frame, and subsequently, generates the thumbnail using at least a part of the subject frame.

When the display varies within a time range of the editing instruction, for example, the controller 101 specifies, as the subject frame, the frame which is the most distinguishing in the time range.

Consideration is given to an editing instruction which indicates addition of a text. According to the editing instruction, the text fades in from a side of a screen. Under such a case, if the thumbnail is generated from a head frame in the time range, the thumbnail for an image in which the text is not yet displayed is generated. Thus, the frame at the time when the fade-in of the text is completed is specified as the subject frame, and the thumbnail corresponding to the specified subject frame is generated.

If the editing instruction has a spatial range in which the editing is applied, the controller 101 may limit a range of an image to be adopted as the thumbnail to only a periphery of the spatial range.

For example, it is supposed that the editing instruction indicates the addition of the stamp, and an area occupied by the stamp with respect to a whole screen is small. In this case, the whole image of the subject frame is adopted as the thumbnail, causing a user to have difficulty to visually recognize the stamp serving as the distinction of the editing.

For the above reason, used for the thumbnail is not the whole image of the subject frame, but only the space around a periphery of the image of the stamp.

With the above, the controller 101 terminates the operation of generating the group of the summary thumbnails.

The group of the summary thumbnails that are generated as above and include one or more thumbnails is outputted from the controller 101 and inputted to the liquid-crystal display 109 via the display device 108. As a result, as shown in FIG. 4, these thumbnails are displayed in the summary thumbnail area 501.

[6. Calculation Example in Operation of Generating Summary Thumbnails]

Here, an example of numerical calculation in operation of generating a group of the summary thumbnails is shown. As an example, consideration is given to a case of generating the group of the summary thumbnails in which the maximum number of the thumbnails is 3, for a 3-minutes video.

In addition, it is also assumed that seven editing instructions (E1 to E7 in FIG. 5) are set in a single editing project file.

E1 is an editing instruction providing an effect that the text is faded in, and used for displaying a text for 10-seconds from 0:00 to 0:10 in the video. The video is displayed in an area of 1,000 pixels in horizontal by 400 pixels in vertical.

Likewise, E2 is an editing instruction for displaying a stamp (flower) from 0:30 to 0:45 in an area of 100 by 100 pixels.

E3 is an editing instruction for displaying a stamp (star) from 1:00 to 1:15 in an area of 100 by 100 pixels. E4 is an editing instruction for displaying a stamp (light) from 1:00 to 1:15 in an area of 100 by 100 pixels. E5 is an editing instruction for displaying the stamp (star) from 1:00 to 1:15 in an area of 100 by 100 pixels.

E6 is an editing instruction for displaying a text (fade-in) from 2:00 to 2:05 in an area of 800 by 100 pixels. E7 is an editing instruction for displaying a stamp (arrow) from 2:30 to 2:45 in an area of 90 by 90 pixels.

Here, the respective time periods required by E3, E4, and E5 are equal to one another. This means the respective stamps are displayed in the different places at the same time in the video.

Hereinafter, a specific example for the operation of generating the group of the summary thumbnail is described, referring to the aforementioned flowchart (FIG. 7) and FIG. 8.

FIG. 8 is a diagram which shows an example of a result of priority calculation on the editing instructions according to the embodiment.

Each of the numerical values of the calculation results shown in FIG. 8 and in the following description is not necessarily a strict value, but may be subjected to be rounded off using rounding, for example.

First, the controller 101 checks a plurality of the editing instructions in Step S500. As a result of the check, E3, E4, and E5 are displayed at the same time in the same time period, so that these are considered as a single editing instruction.

Therefore, a total number of the editing instructions satisfies r=5. As shown in FIG. 8, the seven editing instructions are brought together to be five editing instructions including A1=E1, A2=E2, A3=E3, E4, and E5, A4=E6, A5 =E7.

Next, the controller 101 calculates the priority of each of the editing instructions in Step S501. The below-shown expressions are used for calculating the priority. To be specific, the controller 101 calculates the priority on each of the factors, such as the time period during which the editing instruction is applied, in order to calculate the priority for each of the editing instructions.

The priority t relating to the time period during which the editing instruction is applied is calculated, for example, using Expression 3.

$$t = (\text{time period during which the editing instruction is applied/total length of the video}) \times 1000 \quad \text{Expression 3}$$

In the example, the total length of the video is supposed as three minutes (180 seconds), so that the below-shown Expression 4 can be established using Expression 3.

$$t = (\text{time period during which the editing instruction is applied}/180) \times 1000 \quad \text{Expression 4}$$

Accordingly, the longer the time period is during which the editing indicated in the editing instruction is applied, the larger the priority t becomes which relates to the length of the time period.

The priority s which relates to a size of a space is calculated by Expression 5 or Expression 6, in which the number of pixels for the space to which the editing is applied is assumed to a.

When a<100,000, $$s = a/2,000 + a/100,000 \quad \text{Expression 5}$$

When 100,000≤a<1,000,000, $$s = 50 + a/20,000 + a/1,000,000 \quad \text{Expression 6}$$

Accordingly, the priority s increases, as a increases. In addition, the expression is separated into two stages, so that difference in the number of pixels is not extremely reflected on the priority s.

The priority k in relation to the type of the editing is set, for example, as follows: k=2 when the type is the text (fade-in); K=0, when the type is the stamp (flower); k=0, when the type is the stamp (star); K=0, when the type is the stamp (light); and k=5, when the type is the stamp (arrow).

Since the text is often the important information, the priority for the editing instruction indicating the addition of the text is set to relatively high.

In addition, the priority of the editing instruction indicating the addition of the stamp (arrow) is set higher than those of other editing instructions, because the stamp (arrow) often indicates a part desired to be focused on in the screen.

Next, the controller 101 calculates the priority P(i)=t(i)+s(i)+k(i), where 1≤i≤5, for determining the first thumbnail (selection of the editing instruction to be subjected for a thumbnail).

Upon calculating P (2), since A2 includes three editing instructions, the calculation is conducted under the condition that the number of pixels a is assumed to be a total number of three editing instructions (100×100+100×100+100×100=30,000).

The controller 101 performs the calculation in accordance with the aforementioned expressions and rules, resulting in the priorities P for the respective five editing instructions, shown in FIG. 8, which are P(1)=127.9, P(2)=88.4, P(3)=98.6, P(4)=96, and P(5)=92.4.

Next, the controller 101 selects the editing instruction having the highest priority P in the Step S502. In this case, since P (1) is the highest, A1 is selected as the editing instruction to be the subject for the first thumbnail.

Since the number of the selected editing instruction is 1 which is smaller than 3 of the maximum number of the thumbnails (No in Step S503), the controller 101 shifts the processing to the Step S504.

The controller 101 recalculates the priority P for each of the editing instructions, in order to select the editing instruction to be subjected for the second thumbnail among four editing instructions except for A1, in Step S504. It should be noted that Expression 2 is adopted as a calculation formula for calculating these priorities P.

The thumbnail spacing factor d for a certain editing instruction is calculated using the below-shown Expression 7 or expression 8, under the condition that the minimum absolute value is m which indicates temporal difference between the beginning time of the certain editing instruction and the beginning time of each of one or more editing instructions already selected as the subject for the thumbnail.

When m<the whole length of the video/(the number of the selected editing instructions+1), $$d=0.5+(m/\text{the whole length of the video})/2, \quad \text{Expression 7}$$

When m≥the whole length of the video/(the number of the selected editing instructions+1), $$d=1 \quad \text{Expression 8}$$

Accordingly, the controller 101 calculates the priority using the temporal difference from the already selected editing instruction, for each of one or more editing instructions which are not selected among the editing instructions.

Specifically, if the beginning time of the editing instruction subjected to the calculation of the priority is close to the beginning time of the editing instruction already selected as the subject for the thumbnail, the value d calculated by the controller 101 decreases.

If the difference between the beginning times is sufficiently large, the value is fixed to 1, thereby causing the difference between the beginning times not to so affect on the value of the priority P.

In the example, the whole length of the video/(the number of the selected editing instructions+1)=180/(1+1)=90 seconds.

Accordingly, the absolute value m of the difference in the beginning times between the editing instruction A1 and each of the editing instructions other than A1 (A2 to A5) is expressed as follows: m(2)=30; m(3)=60; m(4)=120; and m(5)=150.

Furthermore, since m(2)=30 satisfies 30<90, Expression 7 is applied and d(2)=0.5+(30/180)/2=0.58 can be calculated.

Similarly, d(3)=0.67, d(4)=1, and d(5)=1 can be calculated. In this case, the priority P in each of the respective editing instructions follows Expression 2: P=(t+s+k)×d, and can be calculated as P(2)=51.5, P(3)=65.7, P(4)=96.0, P(5)=92.4, which are shown in FIG. 8.

Next, the controller 101 selects the editing instruction having the highest priority P from A2 to A5, in the Step S502. Accordingly, A4 is selected as the editing instruction to be the subject for the second thumbnail.

As described above, the thumbnail space factor d allows an editing instruction temporally slightly distant from the subject for the first thumbnail (A1) to be easily selected. As a result, A4 which has the third degree of the priority according to the calculation result in relation to the subject for the first thumbnail is selected as the subject for the second thumbnail.

This avoids the frame to be subjected to the summary thumbnail from extremely biasing on a specified time zone in the video. As a result, the user can easily check the intention of the past editing operation.

Since the number of the selected editing instructions is 2 which is smaller than 3 of the maximum number of the thumbnails in Step S503, the controller 101 shifts the processing to the Step S504.

The controller 101 recalculates the priority of each of the editing instructions in order to determine the subject for the third thumbnail among the remaining three editing instructions (A2, A3, A5) except A1 and A4, in Step S504.

In the example, the whole length of the video/(the number of the selected editing instructions+1)=180/(2+1)=90 seconds.

Since the absolute value of the difference in the beginning times between the editing instruction A2 and the editing instruction A1 is 30 and the absolute value of the beginning times between the editing instruction A2 and the editing instruction A4 is 120, the minimum absolute value is adopted to satisfy m(2)=30. Similarly, m(3)=60 and m(4)=30 are satisfied.

Accordingly, d(2)=0.58, d(3)=1, and d(5)=0.58 are satisfied. As a result, p(2)=51.5, P(3)=98.6, and P(5)=53.9 are calculated.

Next, the controller 101 selects the editing instruction having the highest priority P from A2, A3, and A5, in the Step S502. In other words, A3 is selected as the editing instruction to be a subject for the third thumbnail.

Since the number of the selected editing instructions is 3 which is equal to 3 of the maximum number of the thumbnails in Step S503, the controller 101 shifts the processing to the Step S505.

With respect to the editing for A1, "fade-in" is adopted as the effect, so that the text specified for the A1 is not displayed on the screen at the beginning time (0:00) of the effect. Accordingly, the controller 101 specifies, as the subject frame from which the thumbnail is generated, the frame corresponding to the time of 0:02 with delaying the starting time. The controller 101 cuts an image including a space and a periphery thereof where the text is displayed on, as the image shown in the thumbnail.

Next, the controller 101 specifies a frame corresponding to the beginning time of A2, i.e., 0:30, as the subject frame for A2. The controller 101 determines a position and a range where the stamp indicated by A2 appears sufficiently large, as a spatial position and a spatial range of an image indicated in a thumbnail corresponding to A2.

Next, the controller 101 specifies a frame corresponding to a time of 2:02 by delaying the beginning time, like in the case of A1, as the subject frame corresponding to A4, and cuts an image around the space the text is displayed on, from the subject frame, as an image to be shown in the thumbnail.

As a result of the above processing, a group of summary thumbnails temporally and spatially cut from the video stream can be created. The group of the summary thumbnails is capable of allowing the user to easily recognize the past editing intention.

[7. Advantageous Effects]

As described above, according to the embodiment, the PC 100 includes an editing unit 110, the specifying unit 120, and the thumbnail generating unit 130 (See FIG. 3, for example).

The editing unit 110 generates editing information which indicates a content of editing applied to at least one frame among a plurality of frames included in a video stream, and performs an editing process in which the editing is applied to the aforementioned at least one frame.

The specifying unit 120 specifies a subject frame to be edited by the editing unit 110 from the frames, based on the editing information.

The thumbnail generation unit 130 generates a thumbnail for the subject frame to which the editing is applied, and outputs the generated thumbnail.

In the embodiment, the PC 100 includes the controller 101 functioning as the editing unit 110, the specifying unit 120, and the thumbnail generating unit 130.

In other words, an image editing apparatus (PC 100) includes: a processor that: (i) generates an editing project file indicating a content of editing applied to at least one of frames included in a video stream; (ii) specifies a subject frame to be edited from among the frames, based on the editing project file; and (iii) generates a thumbnail for the subject frame to which the editing has been applied, and outputs the generated thumbnail.

The PC 100 includes the above configuration, thereby generating the editing information indicating the content of the editing specified for the video stream to be edited, and generating the thumbnail indicating the content of the editing.

Accordingly, the thumbnail indicating the content of the editing is efficiently generated without performing cumbersome processing, such as generating the thumbnail indicating the content of the editing by image analysis on an edited video, for example.

As a result, the PC 100 allows the user to easily recognize the editing intention for the video, when the user restarts the halted editing on the video, for example In the embodiment, the processor performs a plurality of editing processes having mutually different contents in terms of the editing, and generates the project file indicating an editing instruction that is the content of the editing for each of the editing processes. The processor selects one editing instruction from among the editing instructions indicated in the editing project file, thereby specifying the subject frame that corresponds to the selected one editing instruction.

With this configuration, if an editing project file including a plurality of editing instructions is created in a single video stream, for example, a single editing instruction can be selected among the editing instructions according to some sort of standard. Therefore, even if a plurality of the editing instructions are included in the editing project file, the thumbnail for visualizing the editing intention is efficiently generated.

In the embodiment, the processor calculates a priority for each of the individual editing contents, using the editing instructions, and selects the one editing instruction having a highest degree of the priority among the editing instructions.

With this configuration, the thumbnail corresponding to the most important editing instruction is generated among the editing instructions included in the editing project file. As a result, the PC 100 can present the user the editing intention corresponding to the editing project file, more clearly, for example.

In the embodiment, the processor selects a predetermined number of the editing instructions from among the editing instructions in descending order of the priority.

With this configuration, the PC 100 can efficiently select the editing instruction to be a subject for the thumbnail among the editing instructions and generate the thumbnails allowing the user to easily recognize the editing intention, for example.

In the embodiment, the processor calculates the priority for each of the editing instructions, using at least one of factors indicated in the editing instruction, which include: (i) a type of the editing; (ii) a temporal position at which the editing is applied; (iii) a length of a time period during which the editing is applied; (iv) a spatial position at which the editing is applied; and (v) a spatial size of an area in which the editing is applied.

With this configuration, the PC 100 can perform weighting for each of the editing instructions, according to a content of the editing, such as increasing the degree of the priority for the editing instruction on a time zone immediately after the video starts and those in a region in the vicinity of the center of the screen, for example. As a result, more adequate editing instruction is selected for the subject for the thumbnail among the editing instructions, for example.

The processor calculates the priority of each of one or more editing instructions which are not selected from among the editing instructions, using a temporal difference from the selected editing instruction.

With this configuration, the subject frames specified as an original from which the thumbnail is generated can be temporally dispersed in a single video stream, for example. In other words, temporal bias on the flame to be made into the thumbnail can be reduced.

As a result, the PC 100 can generate a group of thumbnails including one or more thumbnails capable of allowing the user to more easily recognize the editing intention, for example.

The processor can specify the subject frame, and then applies the editing corresponding to the subject frame to the specified subject frame. The processor can generates the thumbnail for the specified subject frame to which the editing has been applied after the subject frame was specified.

With this configuration, even if a frame which is in a time period indicated in the editing instruction as the time period during which the editing is applied, and to which the editing indicated in the editing instruction is not actually applied, is specified as the subject frame, the thumbnail for the subject frame to which the editing is applied is generated.

In other words, if at least a part of one or more editing instructions indicated in the editing project file is not reflected to the video stream, the thumbnail for the frame which is specified as the subject frame, and to which the editing to the frame is applied is surely generated.

Another Embodiment

As described heretofore, an embodiment is described as an example of technique disclosed in the present application. However, the technique in the present disclosure is not limited to the above, but is applicable to an embodiment to which modification, replacement, addition, omission, and the like are appropriately performed. It is also possible to create a new embodiment by combining structural components described in the above embodiments.

Hereinafter, another embodiment is exemplified.

In the above embodiment, the specifying unit 120 (controller 101 (processor)) selects, among editing instructions, one or more editing instructions to be a subject for the thumbnail, according to a priority of each of the editing instructions.

However, the specifying unit 120 may select the editing instruction to be the subject for the thumbnail without calculating the priority.

The specifying unit 120 may randomly select the editing instruction to be the subject for the thumbnail among the editing instructions, for example. The specifying unit 120 may select three editing instructions including the head, middle, and trail editing instructions when the editing instructions are aligned in the order of the beginning time of each of the editing instructions.

As described above, the specifying unit 120 may select the editing instruction to be the subject for the thumbnail without calculating the priority. This reduces a processing load for the selection of the editing instruction in the PC 100.

In the present embodiment, the selection of the editing project file by the user serves as a trigger for the PC 100 to perform a series of processing in relation to the thumbnail generation (see FIG. 7) after the editing project file is generated.

However, the series of the processing in relation to generating the thumbnail may be performed in another timing. For example, storage of the editing project file (pressing of the project saving button 406) may serve as a trigger to generate one or more thumbnails (a group of summary thumbnails) corresponding to the editing project file.

In this case, when any one of projects is selected in the project loading screen (see FIG. 4), for example, a group of the summary thumbnails corresponding to the selected project can be immediately displayed.

In the present embodiment, various calculation formulas including Expressions 1 to 8 are described as a calculation formula for calculating the priority of the editing instruction. However, these calculation formulas are examples of a calculation formula used for calculating the priority of the editing instruction, and another calculation formula may be used for calculating the priority.

For example, only one or two variable numbers may be used to calculate the priority P among variable numbers relating to three attribute values including a length of a time period to be applied (t), a size of an area to be applied (s), and a type (k), for the editing indicated in the editing instruction.

A part or whole of functions (see FIG. 2) of each of the respective editing unit 110, specifying unit 120, thumbnail generating unit 130 in the embodiment may be achieved by a single or a plurality of integrated circuits. In other words, an image editing apparatus according to the embodiment may be achieved by a combination of dedicated circuits.

In addition, in the present embodiment, the configuration and the processing flow of the PC 100 as an example of the image editing apparatus are described. However, other types of electronic devices may be allowed to function as the image editing apparatus.

For example, a server computer (hereinafter, referred to as "server") connected to the Internet may be allowed to function as the image edition apparatus. A controller executing information processing in the server functions as the editing unit 110, specifying unit 120, and the thumbnail generating unit 130, for example, so that the server can perform the processing of specifying a frame based on the editing project file, generating the subject frame, and so on.

In such a case, the video stream is uploaded to the server from a local PC via the Internet, and the editing operation such as specification of the editing instruction, and the like, can be performed remotely. As deliverables of the editing operation, a project editing file and one or more thumbnail corresponding to the editing project file can be downloaded in the PC.

In addition, electronic devices, such as a mobile terminal, a video camera, and a video recorder may be allowed to function as the image editing apparatus according to the present disclosure.

As described heretofore, an embodiment is described as an example of technique disclosed in the present disclosure. For the disclosure, the attached drawings and the detailed description are provided.

Accordingly, structural components illustrated in the attached drawings and described in the detailed disclosure may include not only necessary structural components but also structural components that are not essential for solving the problems, in order to exemplify the above technique. Therefore, the illustration or description of these unnecessary structural components in the attached drawings and the detailed description should not lead immediate recognition on the necessity of the unnecessary structural components.

The above described embodiments should be referred to as an example of the technique of the present disclosure. Accordingly, various modification, replacement, addition, omission, and the like can be performed within the scope of the claims and the equivalents thereof.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to an image editing apparatus which efficiently performs editing operation for a video. To be specific, the present disclosure is applicable to electronic devices, such as a PC, a server, a mobile terminal, a video camera, and a video recorder. The present disclosure is also applicable to a recording medium, such as a compact disc (CD) or a digital versatile disc (DVD), which stores a program capable of executing similar functions as those in the image editing apparatus.

The invention claimed is:

1. An image editing apparatus comprising:
    a processor that:
    (i) generates an editing information indicating a content of editing applied to at least one of frames included in a video stream, and performs an editing process in which the editing is applied to the at least one frame;
    (ii) specifies a subject frame to be edited from among the frames, based on the editing information; and
    (iii) generates a thumbnail for the subject frame to which the editing has been applied, and outputs the generated thumbnail,
    wherein the processor performs a plurality of editing processes including the editing process and having mutually different contents in terms of the editing, and generates the editing information indicating an individual editing content that is the content of the editing for each of the editing processes,
    the processor selects one individual editing content from among the individual editing contents indicated in the editing information, thereby specifying the subject frame that corresponds to the selected one individual editing content,
    the processor calculates a priority for each of the individual editing contents, using the individual editing contents, and selects the one individual editing content from among the individual editing contents, based on priority, and the processor calculates the priority for each of the individual editing contents, using at least one of factors indicated in the individual editing content, which include: (i) a type of the editing; (ii) a temporal position at which the editing is applied; (iii) a length of a time period during which the editing is applied; (iv) a spatial position at which the editing is applied; and (v) a spatial size of an area in which the editing is applied.

2. The image editing apparatus according to claim 1, wherein the processor selects a predetermined number of the individual editing contents from among the individual editing contents in descending order of the priority.

3. The image editing apparatus according to claim 1, wherein the processor calculates the priority of an individual editing content which is not selected from among the individual editing contents, using a temporal difference from the selected individual editing content.

4. The image editing apparatus according to claim 1, wherein the processor specifies the subject frame, applies the editing corresponding to the subject frame to the specified subject frame, and subsequently generates the thumbnail for the specified subject frame to which the editing has been applied.

5. A thumbnail generating method which is performed by an image editing apparatus including a processor, the thumbnail generating method comprising:

generating an editing information indicating a content of editing applied to at least one frame among a plurality of frames included in a video stream;

specifying a subject frame to be edited from among the frames, based on the editing information;

generating a thumbnail for the subject frame to which the editing is applied, and outputting the thumbnail;

performing a plurality of editing processes having mutually different contents in terms of the editing, and generating the editing information indicating an individual editing content that is the content of the editing for each of the editing processes;

selecting one individual editing content from among the individual editing contents indicated in the editing information, thereby specifying the subject frame that corresponds to the selected one individual editing content;

calculating a priority for each of the individual editing contents, using the individual editing contents, and selects the one individual editing content from among the individual editing contents, based on priority; and calculating the priority for each of the individual editing contents, using at least one of factors indicated in the individual editing content, which include: (i) a type of the editing; (ii) a temporal position at which the editing is applied; (iii) a length of a time period during which the editing is applied; (iv) a spatial position at which the editing is applied; and (v) a spatial size of an area in which the editing is applied.

* * * * *